E. F. DUTTON.
MEANS FOR TRANSFERRING LOAD FROM ONE GENERATOR STATION TO ANOTHER.
APPLICATION FILED NOV. 2, 1911.

1,065,302. Patented June 17, 1913.

Witnesses:
Earl G. Klock
J. Ellis Glen

Inventor:
Edgar F. Dutton,
by Albert G. Davis
His Attorney.

UNITED STATES PATENT OFFICE.

EDGAR F. DUTTON, OF SCHENECTADY, NEW YORK, ASSIGNOR TO GENERAL ELECTRIC COMPANY, A CORPORATION OF NEW YORK.

MEANS FOR TRANSFERRING LOAD FROM ONE GENERATOR-STATION TO ANOTHER.

1,065,302.  Specification of Letters Patent.  Patented June 17, 1913.

Application filed November 2, 1911. Serial No. 659,669.

*To all whom it may concern:*

Be it known that I, EDGAR F. DUTTON, a citizen of the United States, residing at Schenectady, county of Schenectady, State of New York, have invented certain new and useful Improvements in Means for Transferring Load from one Generator-Station to Another, of which the following is a specification.

My invention relates to transferring load from one generator station to another and comprises an arrangement of automatic circuit breakers and connections, such that the load may be transferred in whole or in part to either generator station without interrupting the supply of current to the load and without throwing the stations into multiple more than momentarily.

My invention while not limited to use on battleships is particularly useful thereon.

It is customary on large battleships to have two dynamo rooms operating at the same voltage and each normally supplying, through adjacent feeder panels, the power or light for part of the ship. Ordinarily one dynamo room is of sufficient capacity to handle all of the apparatus in operation, and therefore, it is often desirable to transfer all of the load to one dynamo room, permitting the sets in the second dynamo room to be shut down. Under special conditions, when practically all the apparatus on a ship is in operation, it is necessary to run both dynamo rooms each supplying its part of the ship, but during normal conditions, when one dynamo room will suffice, it is customary to run them alternately in order to be sure that each is in good condition. It is undesirable from an operative standpoint to run the two dynamo rooms in multiple, and therefore, when the load is transferred from one room to the other it is necessary either to interrupt the operation of the motors or to provide a means of making the transfer without placing the two stations in multiple.

By my invention the load may be transferred from either generator to the other without interruption of the supply and the generator station from which the load is transferred is automatically cut out of circuit as soon as the transfer is made.

My invention will be best understood from the accompanying drawings in which—

Figure 1:
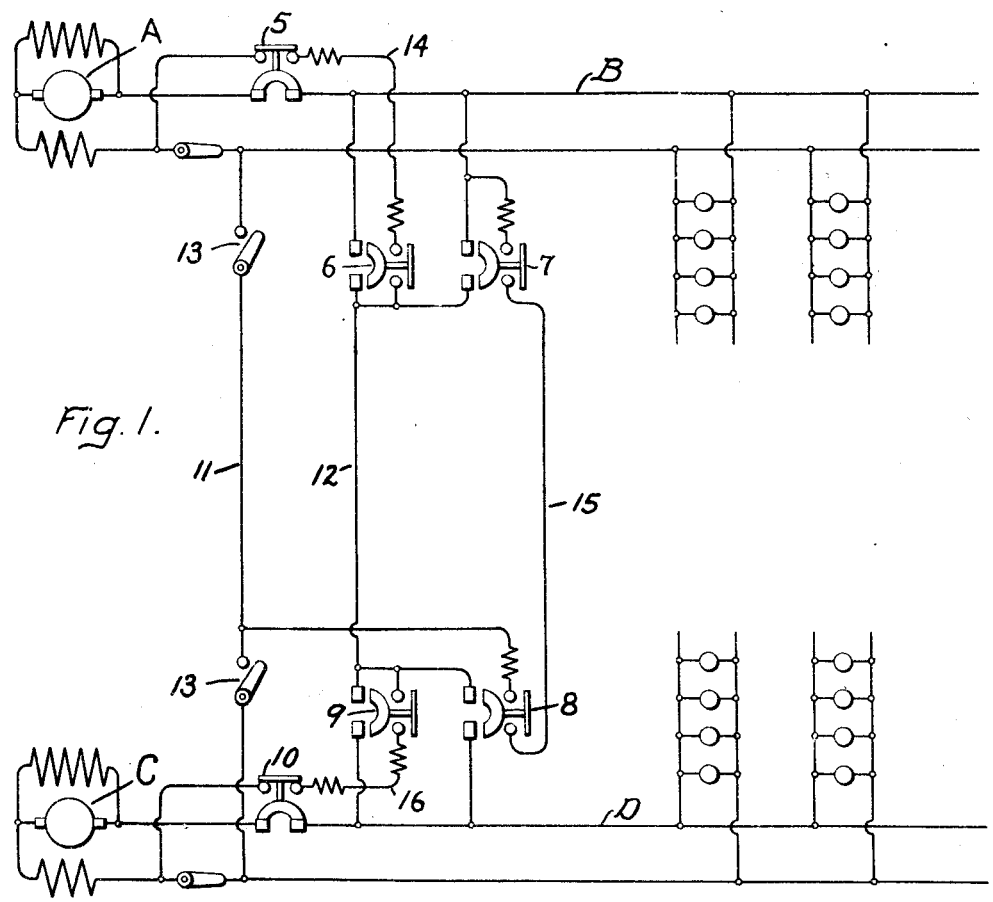
Figure 2:
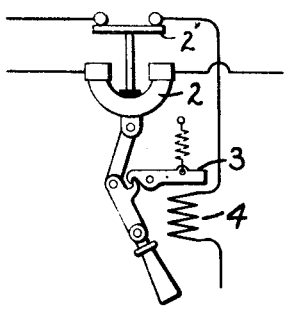

Figure 1 is a diagrammatic plan of the preferred arrangement; Fig. 2 is a detailed view of one form of automatic circuit breaker, suitable for use in the arrangement of Fig. 1.

Generating station A normally feeds the circuit B and generating station C normally feeds the circuit D. Transfer bus bars 11 and 12 are arranged between the stations for connecting circuits B and D together when both circuits are supplied by one generating station. Generally, as in the case illustrated, the circuits will preferably be connected in multiple. For connecting and disconnecting one of these bus bars 11 to and from similar sides of circuits B and D, switches or circuit breakers 13 of any desired construction may be used. In addition to the switches 13, various other switches or circuit breakers, whose positions will be later described, are used. A preferred form of these later circuit breakers is shown in Fig. 2. In Fig. 2 is shown a circuit breaker comprising two sets of contacts, a main and supplemental set, both sets being closed simultaneously respectively by the contacts 2 and 2'. This circuit breaker may be closed by hand in the ordinary way and is locked closed by means of the latch 3 which is under the control of a trip coil 4. The trip coil is in series with the auxiliary contacts of the circuit breaker. The circuit breaker may be opened either by energizing the coil 4, or manually or otherwise depressing the latch 3. Between the generator station A and the circuit B is located one of these circuit breakers 5. A similar circuit breaker 10 is located between station C and the circuit D. Two similar circuit breakers 6 and 9 are located between the ends of the bus bar 12 and similar sides of the circuits B and D. The auxiliary contacts and the trip coils of these circuit breakers are connected in series in pairs. Thus the auxiliary contacts and the trip coils of switches 5 and 6 are connected in series between the bus bar 12 and one side of the circuit B through the connection 14. Likewise the auxiliary contacts and trip coils of circuit breakers 9 and 10 are connected in series between the bus bar 12 and one side of the circuit D through the connection 16. Two other circuit breakers 7 and 8 are provided, their auxiliary contacts and trip coils being connected in series between the bus bar 11 and one side of the circuit B, as illustrated. These circuit breakers 7 and 8 control respectively connections between similar sides of the circuits B and D and the bus bar 12. These connections are of sufficient capacity to carry the load on each of the circuits B and D.

The only essential feature of the connection of the auxiliary contacts and the trip coils besides their respective series connections in pairs, is that they be connected to some suitable source of energy. The connections illustrated and described satisfy this condition to the extent that when the system is properly manipulated the trip coil connections are supplied with energy at all times when they require energy.

Now it will be apparent from the description of the respective automatic circuit breakers and their connections that only one circuit breaker of each pair may be closed at a time. Whenever one circuit breaker is closed, the trip coil of its companion is energized and its companion circuit breaker therefore opened.

The operation is as follows: Suppose that the two generating stations A and C are each supplying their respective circuits B and D, which is the condition illustrated in the drawing, and that it is desired that the station C be disconnected and the entire load assumed by the station A. First the switches 13 are closed. Then the circuit breaker 7 is closed; the bus bar 12 is thus raised to the potential of one side of the circuit B. If circuit breaker 8 is not already open, it is opened at this time, since its trip coil is energized through the auxiliary contacts of the circuit breaker 7. The circuit breaker 9 may now be closed and by its closing the circuit breaker 10 is opened. It will now be seen that the generating station A is supplying the circuit B as before and is also supplying the circuit D through the circuit breaker 7, the bus bar 12 and circuit breaker 9, the return being completed through the bus bar 11 and the switches 13. To return the system to its original condition, the circuit breaker 10 is closed, the closing of this circuit breaker causing the opening of the circuit breaker 9 through the energization of its trip coil. The circuit breaker 7 may then be opened either by manually depressing its latch 3 or by closing the circuit breaker 8. The switches 13 are later opened. The system has now been returned to the condition shown in the drawing, except that the circuit breaker 8 may be closed. It will generally be found desirable to open this switch if it is closed, by manually depressing its latch 3, for otherwise the bus bar 12 is maintained at the potential of one side of the circuit D. The operation necessary to transfer the entire load to the generating station C is similar to the operation described and will be understood without further explanation.

It will be apparent that the transfer is made from one station to the other without connecting the stations in multiple otherwise than for the short period of time necessary for a circuit breaker to operate when released by the energization of its trip coil. Of course it is necessary to hold a circuit breaker closed for a short period of time after its contacts engage long enough to allow its companion to open its auxiliary contacts, for at the instant of closing both trip coils are energized. This will, however, give no trouble in operation.

While I have described my invention as embodied in concrete form for the purpose of illustration showing only two generators and two load circuits with circuit breakers and connections, I do not intend my invention to apply only to the same, but I intend my invention to cover any number of circuits, circuit breakers, and connections used for the transference of load from one or more circuits to any other embodying the principle in my invention, whether such circuit or circuits are energized by one or more generators or other means for supplying electricity. Likewise, I am using electrically interlocked circuit breakers, Fig. 2, such as I deem best to be used, but I do not limit my invention to electric interlocking devices, for operating the circuit breakers, but intend it to cover all modifications within the scope of my invention.

What I claim as new and desire to secure by Letters Patent of the United States, is,—

1. In combination, a plurality of generator stations, a plurality of load circuits, an automatic circuit breaker between each generator station and a load circuit, a plurality of switches for connecting a plurality of said load circuits together and a plurality of control circuits controlled by said switches for selectively tripping the circuit breakers for the generator stations upon the closing of said switches.

2. In combination, a plurality of generator stations, a plurality of load circuits, an automatic circuit breaker between each generator station and a load circuit, switching means for connecting a plurality of said load circuits together and means controlled by said switching means controlling one of said circuit breakers.

3. In combination, a plurality of generator stations, a plurality of load circuits, an automatic circuit breaker between one of said generator stations and a load circuit, switching means for connecting a plurality of said load circuits together and for disconnecting the same, and means controlled by said circuit breaker for controlling said switching means.

4. In combination, a plurality of generator stations, a plurality of load circuits, automatic circuit breakers between said generator stations and their respective load circuits, automatic switches for connecting said load circuits together and disconnecting the same, and means connecting the circuit breakers and switches in pairs, each means being controlled by its circuit breaker and switch for controlling its switch and circuit breaker respectively.

5. In combination, a plurality of generator stations, a plurality of load circuits, an automatic circuit breaker between each generator station and a load circuit, other automatic circuit breakers for connecting a plurality of said load circuits together and for disconnecting the same, and selective interlocking means between the two sets of circuit breakers.

In witness whereof, I have hereunto set my hand this 31st day of October, 1911.

EDGAR F. DUTTON.

Witnesses:
HELEN ORFORD,
MARGARET E. WOOLLEY.

Copies of this patent may be obtained for five cents each, by addressing the "Commissioner of Patents, Washington, D. C."